United States Patent
Morisaki et al.

(10) Patent No.: US 7,336,972 B2
(45) Date of Patent: Feb. 26, 2008

(54) DATA PROCESSING SYSTEM FOR A MULTI-FUNCTION DEVICE

(75) Inventors: Hiroshi Morisaki, Aichi-ken (JP); Jing Yang, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 87 days.

(21) Appl. No.: 10/809,411

(22) Filed: Mar. 26, 2004

(65) Prior Publication Data

US 2005/0003859 A1 Jan. 6, 2005

(30) Foreign Application Priority Data

Mar. 28, 2003 (JP) ............................ P2003-092174

(51) Int. Cl.
*H04B 1/38* (2006.01)
(52) U.S. Cl. .................................... 455/557; 455/412.1
(58) Field of Classification Search .............. 455/557, 455/412.1
See application file for complete search history.

(56) References Cited

U.S. PATENT DOCUMENTS

| | | | |
|---|---|---|---|
| 5,508,821 A | | 4/1996 | Murata et al. |
| 5,764,866 A | * | 6/1998 | Maniwa ...................... 358/1.15 |
| 5,974,233 A | | 10/1999 | Nishiyama et al. |
| 7,051,281 B1 | | 5/2006 | Yokota |
| 2002/0032671 A1 | * | 3/2002 | Iinuma ........................... 707/1 |
| 2002/0060798 A1 | * | 5/2002 | Shimada ...................... 358/1.9 |
| 2002/0082001 A1 | * | 6/2002 | Tanaka et al. ............... 455/414 |
| 2002/0165800 A1 | * | 11/2002 | Ogura et al. .................... 705/27 |
| 2004/0174561 A1 | * | 9/2004 | Fukunaga et al. ......... 358/1.15 |
| 2006/0010229 A1 | * | 1/2006 | Chen et al. .................. 709/219 |

FOREIGN PATENT DOCUMENTS

| | | |
|---|---|---|
| DE | 41-06-455 A1 | 9/1992 |
| EP | 0-691-782 A2 | 1/1996 |
| EP | 1-030-512 A2 | 8/2000 |
| EP | 1-463-288 A1 | 9/2004 |
| EP | 1-463-289 A2 | 9/2004 |
| JP | A-10-254799 | 8/1997 |
| JP | A-9-214737 | 9/1998 |
| JP | A-2000-075989 | 3/2000 |
| JP | 2001-282694 | 10/2001 |
| JP | A-2001-282694 | 10/2001 |
| JP | A 2001-282694 | 10/2001 |

* cited by examiner

*Primary Examiner*—Duc M. Nguyen
*Assistant Examiner*—Justin Lee
(74) *Attorney, Agent, or Firm*—Oliff & Berridge, PLC

(57) ABSTRACT

To enable a main terminal device to implement specific functions in cooperation with a sub terminal device, when a fax machine serving as the main terminal device stores conversion request data in a shared area of its RAM (S130), a personal computer serving as the sub terminal device generates converted image data based on the conversion request data stored on the fax machine end and stores the resulting data on the fax machine end. Subsequently, the fax machine reads the converted image data stored by the personal computer and transmits this image data. In this way, the fax machine can direct the personal computer to execute part of the process simply by storing request data in a shared area of the RAM, thereby transmitting converted image data in cooperation with the personal computer.

17 Claims, 11 Drawing Sheets

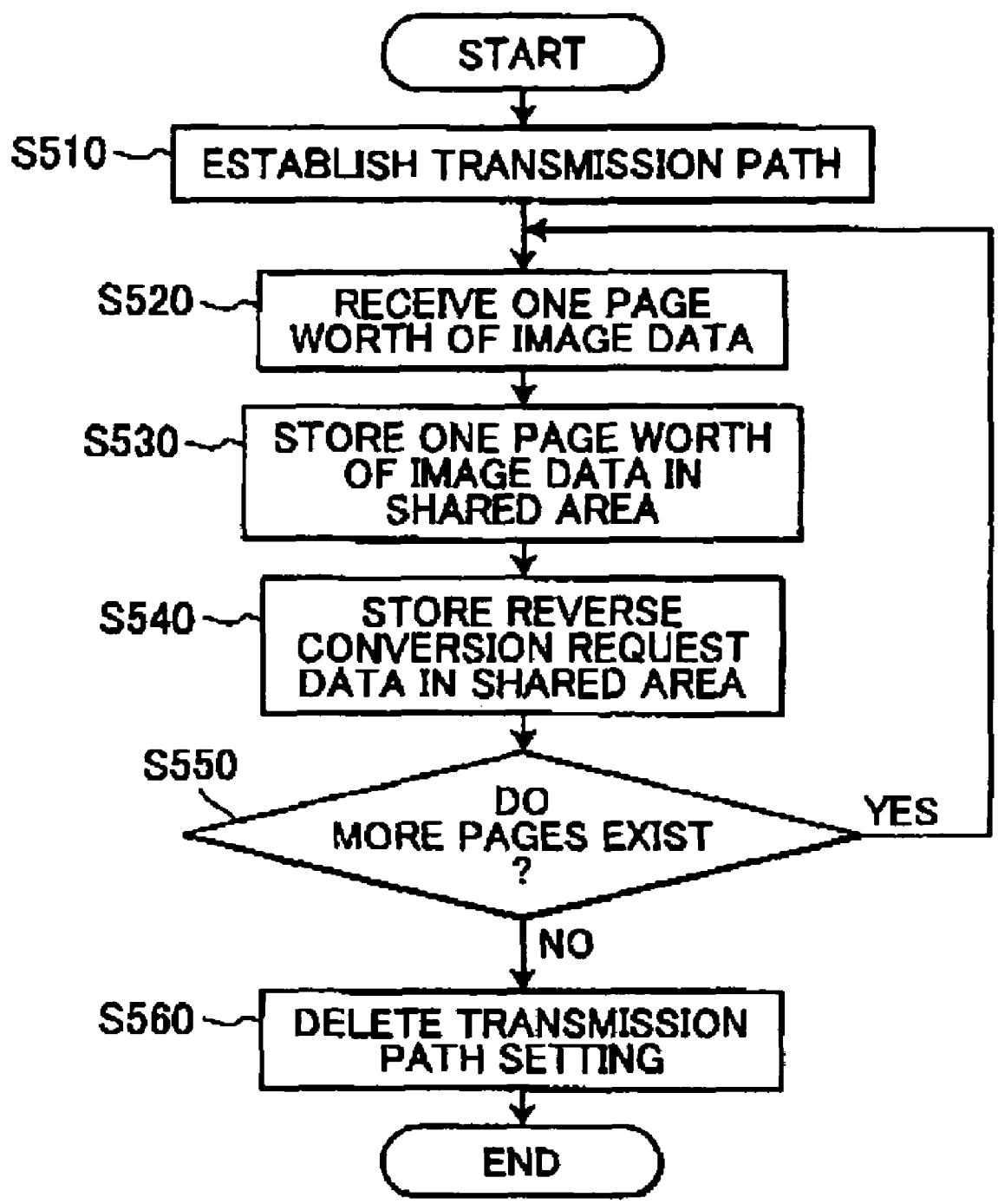

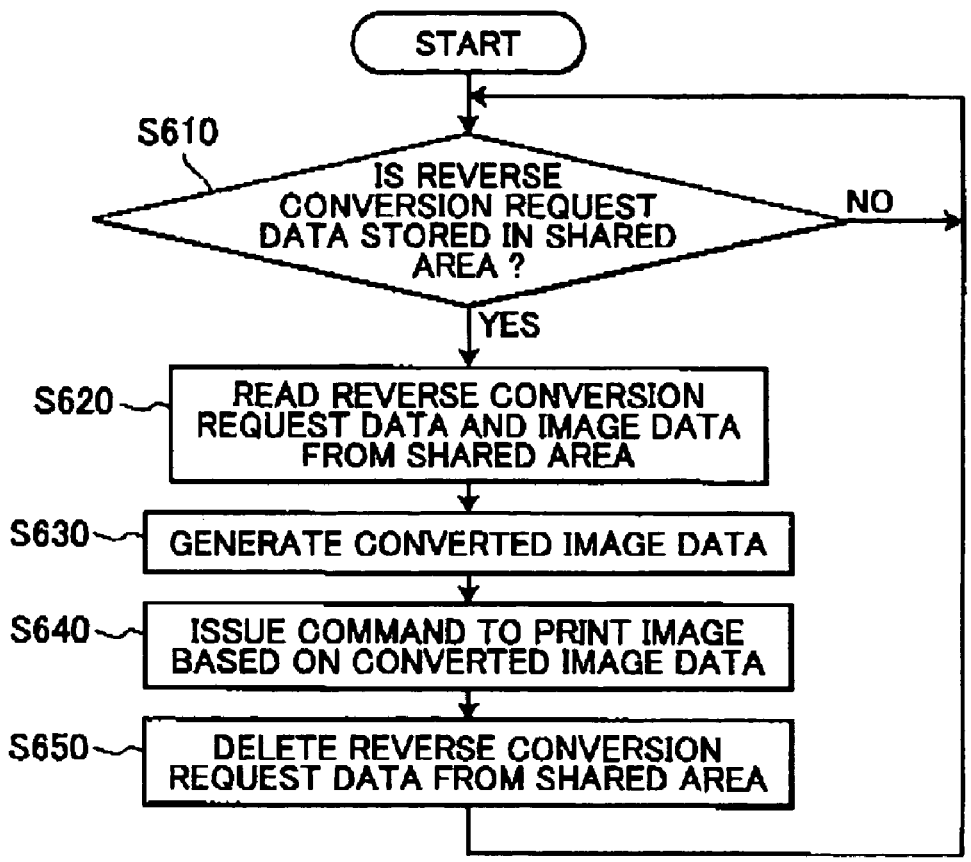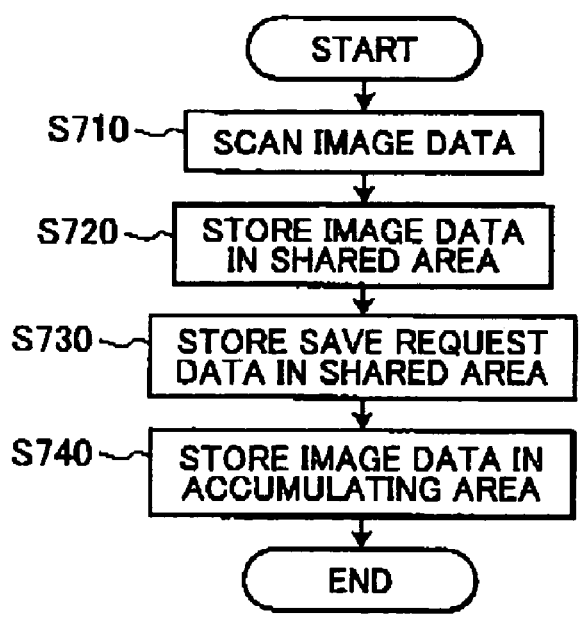

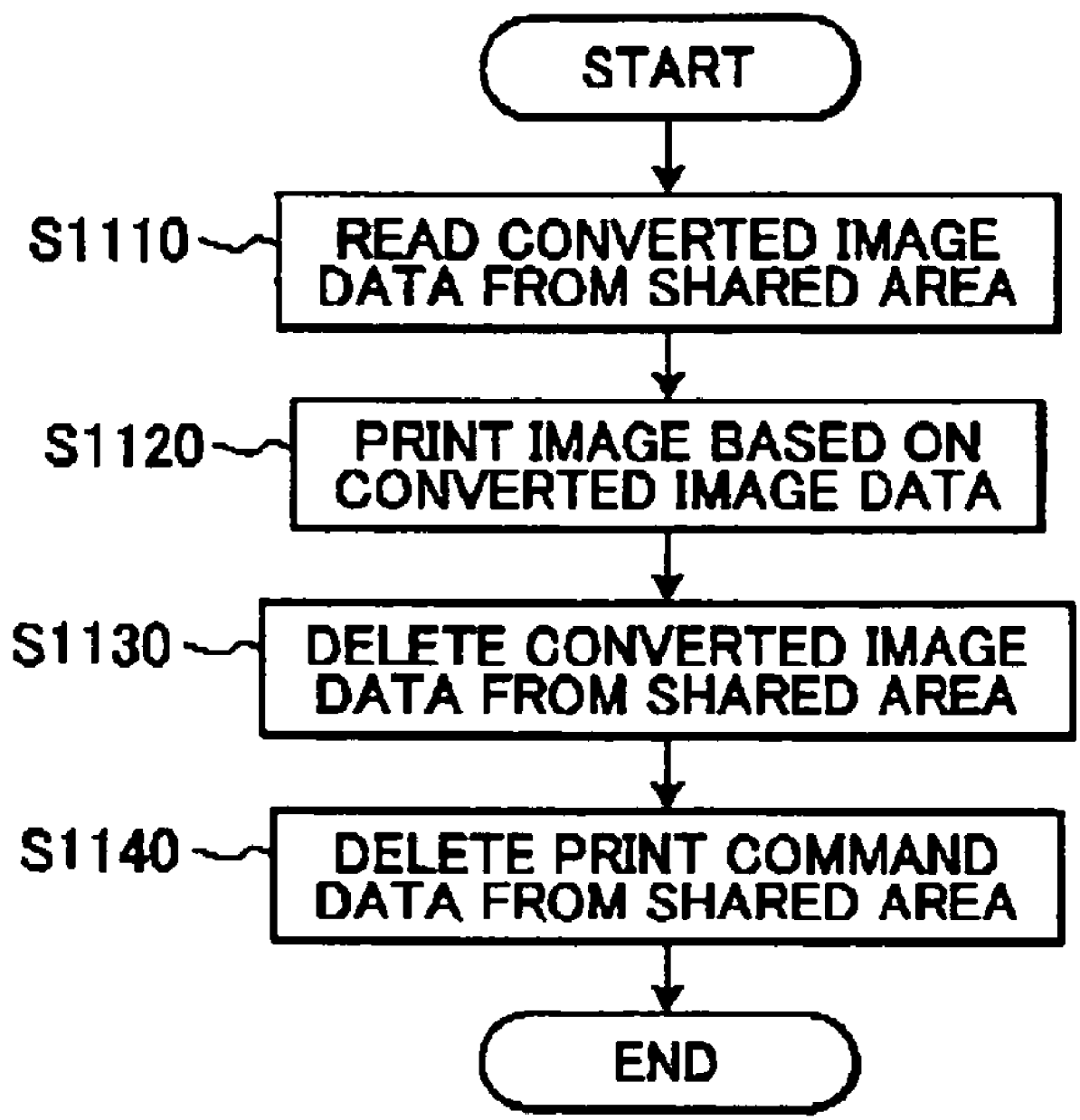

DATA PROCESSING SYSTEM FOR A MULTI-FUNCTION DEVICE

BACKGROUND OF THE INVENTION

1. Field of the Invention

The present invention relates to a data processing system for implementing specific functions through the coordinated operations of a main terminal device and a sub terminal device.

2. Description of the Related Art

Today terminal devices having such functions as a telephone, facsimile, printer and scanner are in use. When serving as a main terminal, many of these terminal devices are configured to execute a process for implementing the above functions in response to commands from a sub terminal device that is connected to and capable of performing data communications with the main terminal device.

One such types of main terminal devices (facsimile machine A) is disclosed in Japanese patent application publication No. 2001-282694. The device includes a storage unit (RAM 12) and is connected to a sub terminal device (personal computer PC), which can recognize the storage unit as an external storage device connected to the sub terminal device itself. When data received from the sub terminal device is stored in the storage unit, the main terminal device prompts the user to select a function for processing the data and subsequently processes the data according to the selected function.

With the main terminal device described above, data can easily be exchanged with the sub terminal device via the storage unit. By the main terminal device executing processes in conjunction with the sub terminal device while exchanging data therebetween to achieve specific functions, the processing load on the main terminal device end can be reduced.

Accordingly, in recent years there has been demand for a technology capable of coordinating operations with a sub terminal device to execute specific functions of the main terminal device.

SUMMARY OF THE INVENTION

In view of the foregoing, it is an object of the present invention to provide a technology capable of coordinating operations with a sub terminal device to achieve specific functions of the main terminal device.

According to one aspect of the invention, there is provided a data processing system that includes a main terminal device having one or more functions, and a sub terminal device connected to the main terminal device and performs data communications therewith. The main terminal device includes;
 a data storing unit that stores various types of data, and enables the sub terminal device to recognize the data storing unit as an external storage device so as to enable the sub terminal device to be accessible to the data storing unit;
 a request storage commanding unit that receives commands from an external source and stores request data in the data storing unit, the request data being generated from the main terminal device for requesting the sub terminal device to generate implementation data required for implementing one or more functions; and
 a function implementing unit that executes a process to implement a function based on the implementation data when the implementation data is transmitted from the sub terminal device following a command by the request storage commanding unit.

The sub terminal device includes;
 a data generating unit that generates the implementation data when the request data is stored in the data storing unit: and
 an implementation data transmitting unit that transmits the implementation data generated by the data generating unit to the main terminal device.

With the data processing system having this construction, when the main terminal device stores request data in the data storing unit provided in the main terminal device itself, the sub terminal device generates implementation data based on the request data stored on the main terminal device end and transmits this implementation data to the main terminal device. The main terminal device then executes a process to implement a specific function based on the implementation data transmitted from the sub terminal device. In this way, the main terminal device can direct the sub terminal device to execute a portion of the process simply by storing request data in the data storing unit provided in the main terminal device itself, thereby implementing specific functions in cooperation with the sub terminal device.

The "one or more functions" possessed by the main terminal device described above can be a printing function, for example, for printing images based on the image data on a recording medium.

According to another aspect of the invention, there is provided a storage medium that stores a program for controlling a main terminal device and a sub terminal device connected in use to each other so as to be capable of performing data communications therebetween. The programs stored in the storage medium are:
 a program of enabling the sub terminal device to recognize a data storing unit of the main terminal device as an external storage device so as to enable the sub terminal device to be accessible to the data storing unit;
 a program of receiving commands from an external source and storing request data in the data storing unit, the request data being generated from the main terminal device for requesting the sub terminal device to generate implementation data required for implementing one or more functions of the main terminal;
 a program of generating the implementation data in the sub terminal device in response to the request data; and
 a program of executing a process to implement a function of the main terminal device based on the implementation data generated by the sub terminal.

According to still another aspect of the invention, there is provided a storage medium that stores a program for controlling a main terminal device and a sub terminal device connected in use to each other so as to be capable of performing data communications therebetween. The programs stored in the storage medium are:
 a program of generating request data in the main terminal device for requesting the sub terminal device to generate implementation data required for implementing a function of the main terminal device;
 a program of generating implementation data in the sub terminal device;
 a program of transmitting the implementation data from the sub terminal device to the main terminal device; and
 a program of executing a process to implement the function of the main terminal device based on the implementation data after the program of transmitting the implementation data is executed.

BRIEF DESCRIPTION OF THE DRAWINGS

In the accompanying drawings:

FIG. 8 is a flowchart showing steps in a facsimile reception process executed by the fax;

FIG. 9 is a flowchart showing steps in a reverse format conversion process executed by the PC:

FIG. 10 is a flowchart showing steps in a scanning process executed by a fax according to a second embodiment;

FIG. 15 is a flowchart showing steps in a printing process executed by a fax according to a variation of the embodiments.

DETAILED DESCRIPTION OF THE PREFERRED EMBODIMENTS

Figure 1:
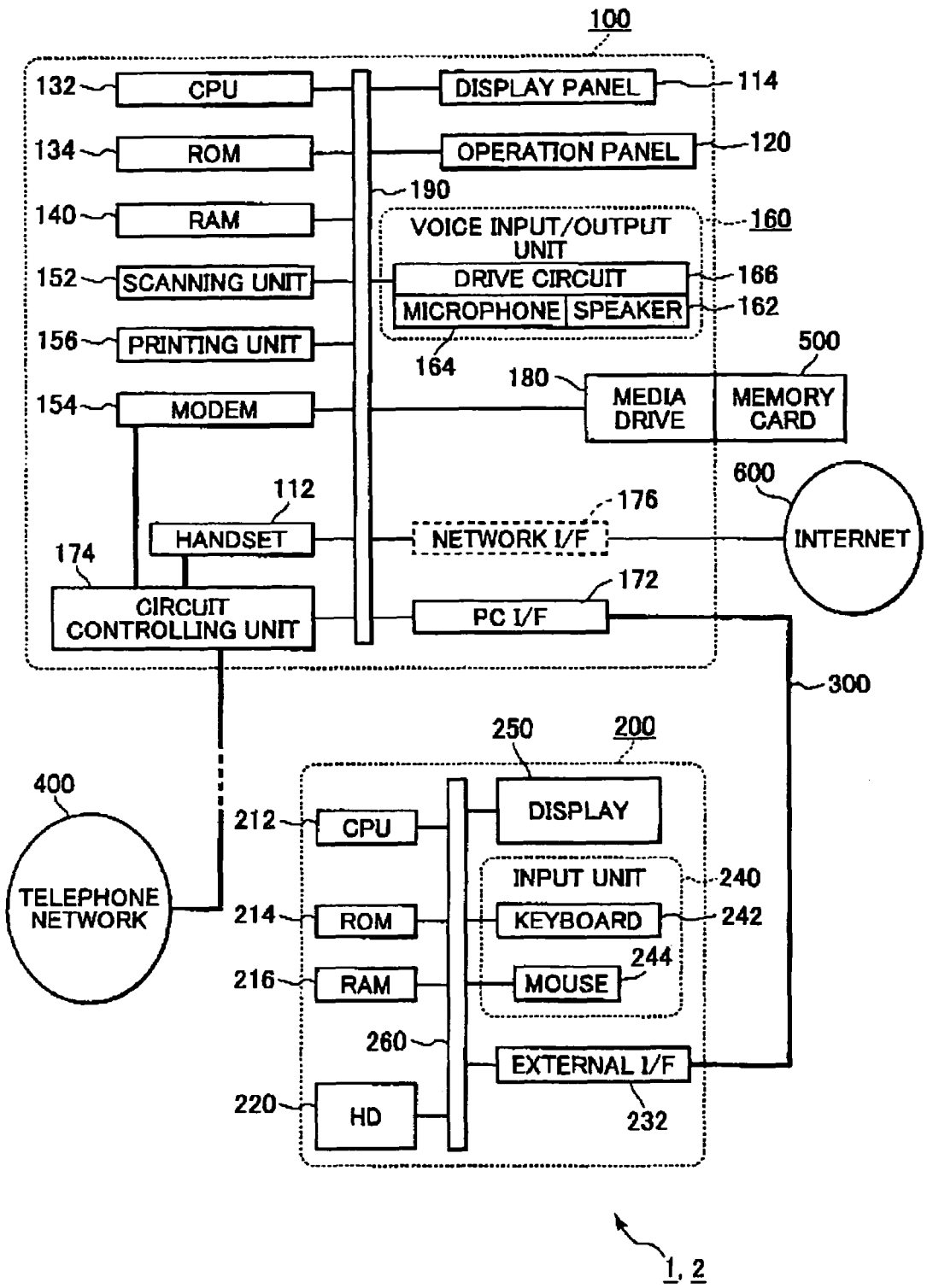
FIG. 1 is a block diagram showing the structure of a data processing system according to a preferred embodiment.

Next, preferred embodiments of the present invention will be described while referring to the drawings.

First Embodiment

As shown in FIG. 1, a data processing system 1 includes a facsimile machine (hereinafter abbreviated as fax) 100 and a personal computer (hereinafter abbreviated as PC) 200 that are connected and capable of performing data communications with one another via a communication cable 300.

The fax 100 includes a handset 112, a display panel 114, a control panel 120, a CPU 132, a ROM 134, a RAM 140, a scanning unit 152, a modem 154, a printing unit 156, a voice input/output unit 160, a PC interfacing unit (hereinafter referred to as PC I/F) 172, a circuit controlling unit 174, a media drive 180, and the like. Here, the handset 112 is a transceiver used when removed from the body of the fax 100. Further, the display panel 114 receives commands from the CPU 132 and displays various data.

The control panel 120 includes a plurality of input buttons for inputting numbers and symbols, a speakerphone button for implementing a hands-free call with the voice input/output unit 160, a start button for initiating execution of the various functions, and the like.

The CPU 132 controls overall operations of the fax 100 by transmitting commands (control signals) via a bus 190 to the various components of the fax 100 according to a procedure directed by a computer program that is stored in the ROM 134.

Figure 2:
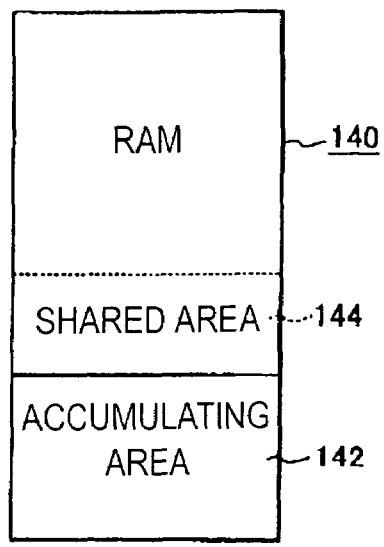
FIG. 2 shows storage areas of RAM provided in the fax.

As shown in FIG. 2, part of the storage area in the RAM 140 is a shared area 142 that the PC 200 connected to the fax 100 can recognize as an external storage unit (virtual drive) connected to the PC 200 itself. Accordingly, the PC 200 can recognize the shared area 142 as a storage area that can be accessed (to store and delete data) by a file system, which is part of a function provided standard in an OS (operating system). This shared area has a tree-like folder structure (also called a directory) for sorting and storing data files in folders.

The scanning unit 152 receives commands from the CPU 132 and scans images from paper loaded in a prescribed scanning position (not shown in the drawings) to generate image data based on these images. The image data is encoded and modulated by the modem 154 to generate image signals that can be transferred to a telephone network 400 and subsequently outputs the image signals to the telephone network 400 via the circuit controlling unit 174.

The printing unit 156 receives commands from the CPU 132 and prints images based on image data on paper set or loaded at a prescribed paper feeding position (not shown in the drawings). Image data on which printing of the image is based might be generated, for example, from image signals inputted from the telephone network 400 via the circuit controlling unit 174 that are demodulated and decoded by the modem 154.

The voice input/output unit 160 includes a speaker 162, a microphone 164, and a drive circuit 166 for driving the speaker 162 and microphone 164. In addition to outputting voice from the speaker 162 based on various voice signals, the voice input/output unit 160 can be used for performing a hands-free call by controlling the speaker 162 and microphone 164 to function as a transceiver.

The PC I/F 172 is an interface for connecting the fax 100 to the PC 200 via the communication cable 300, by which data communications is made possible between the fax 100 and PC 200.

The circuit controlling unit 174 inputs various signals from the telephone network 400 and outputs signals to the telephone network 400. The circuit controlling unit 174 also receives commands from the CPU 132 and sets the transmission path including a transmission destination and a transmission source for signals inputted from and outputted to the telephone network 400.

When performing an off-hook operation by removing the handset 112 from the body of the fax 100 or by pressing the speakerphone button on the control panel 120, the transmission path for the destination and source of signals inputted from and outputted to the telephone network 400 is set to a path from the circuit controlling unit 174 to the handset 112 or the voice input/output unit 160, enabling voice signals to be transmitted along this path. The transmission path established in this way is disconnected upon execution of an on-hook operation in which the handset 112 is returned to the body of the fax 100 or the speakerphone button is pressed a second time, thereby preventing voice signals from being transmitted on the path.

If a series of operations is performed while paper to be scanned is set in the scanning position in which operations an identification number for a transmission destination (a telephone number in the present embodiment) is inputted by input buttons on the control panel 120 and subsequently the start button is pressed (hereinafter referred to as a fax transmission operation), or when the input of image signals is initiated on the telephone network 400 end, the path to the modem 154 is set as the transmission path, enabling the transmission of image signals along this path. When the output of image signals by the modem 154 ends or when input of image signals from the telephone network 400 ends, this transmission path is disconnected preventing further transmission of image signals on the path.

The media drive 180 accepts mounting of a memory card 500 and can read data from a mounted memory card 500 or record data thereon. "Memory card" in the present embodiment refers to such media as CompactFlash (registered trademark), SmartMedia (registered trademark), Memory Stick (registered trademark), MultiMediaCard, and SD Memory Card.

The PC 200 includes a CPU 212, a ROM 214, a RAM 216, a hard disk (hereinafter abbreviated as HD) 220, an external interfacing unit (hereinafter referred to as an external I/F) 232, an input unit 240, a display 250, and the like connected to one another via a bus 260.

In addition to various application programs, the HD 220 stores coordinated processing programs described later for executing a format converting process (FIG. 4), a transmission requesting process (FIG. 5), and a reverse format converting process (FIG. 9); device drivers for controlling operations of the fax 100; and the like.

The external I/F 232 is an interface for connecting the PC 200 to the fax 100 via the communication cable 300, by which data communications is enabled between the PC 200 and the fax 100. The telephone network 400 is an input device including a keyboard 242 and a mouse 244.

Next, the process executed by the fax 100 and PC 200 when the fax 100 performs facsimile communications will be described for various initial conditions of the facsimile machine.

(1) First Facsimile Transmission Process Executed by the Fax 100 when an Operation Initiated on the Fax 100 end Begins Transmission of Image Data The steps in the first facsimile transmission process executed by the CPU 132 provided in the fax 100 will be described with reference to FIG. 3. This first facsimile transmission process is initiated when a fax transmission operation described above is executed while paper having a printed color image is loaded in the scanning position.

First, the scanning unit 152 scans the image printed on the paper as color image data (S110). Next, the CPU 132 stores the image data scanned in the process of S110 in the shared area 142 of the RAM 140 (S120).

Next, the CPU 132 stores conversion request data in the shared area 142 requesting the conversion of the image data stored in S120 (S130). In this process, data specifying a conversion data format is generated as data requesting that the color image data be converted to a data format suitable for a facsimile transmission (in the present embodiment, the JPEG (Joint Photographic Experts Group) format and is stored in a form appended to the image data that was stored in the process of S120. In addition, the process of S130 starts a counter for measuring elapsed time after the conversion request data is stored in the shared area 142.

After the conversion request data is stored in the shared area 142, the PC 200 generates converted image data by converting the data format of the image data stored in the shared area 142 in a format converting process (FIG. 4) described later and stores the converted image data in the shared area 142. Next, the CPU 132 checks whether converted image data has been stored in the shared area 142 (S140).

If converted image data has not yet been stored during the process of S140 (S140: NO), then the CPU 132 determines if storage of the conversion request data has been timed out (S150). In this process, if the count value of the timer that was started in S130 is greater than or equal to a prescribed threshold value (5 seconds in the present embodiment), then the operation is determined to have been timed out.

If it is determined in S150 that a timeout has not occurred (S150: NO), then the CPU 132 returns to the S140. However, if a timeout has occurred in the process of S150 (S150: YES), then a notification is issued indicating that converted image data was not recorded in the shared area 142 (S160), and the first facsimile transmission process ends. Notification in the process of S160 is issued by displaying a message on the display panel 114 indicating that a problem has occurred that is preventing the PC 200 from recording the converted image data. In addition, the timer started in the process of S130 is stopped and reset in the process of S160.

However, if the converted image data was stored in the process of 8140 (S140: YES), then this converted image data is read from the shared area 142 (S170). In this process, not only is the converted image data read, but also the timer started in the process of S130 is stopped and reset.

Next, the converted image data read in the process of S170 is transmitted to the transmission destination based on the identification number inputted in the fax transmission operation (S180). In this process, the CPU 132 controls the circuit controlling unit 174 to establish a path connecting the modem 154 to the telephone network 400 as the signal transmission path, enabling image signals to be transmitted along this path. Next, the converted image data read in the process of S170 is transmitted to the transmission destination based on the identification number inputted in the fax transmission operation. By controlling the circuit controlling unit 174 to cancel the established path connecting the modem 154 and the telephone network 400 as the transmission path, image signals can no longer be transmitted on this path.

Next, the converted image data read in the process of S170 is deleted from the shared area 142 (8190), and the first facsimile transmission process ends.

<Format Conversion Process Executed by the PC 200>

Next, steps in a format conversion process executed by the CPU 212 disposed in the PC 200 will be described with reference to FIG. 4. The format conversion process is repeatedly executed while the coordinated processing program is being executed.

First, the CPU 212 waits until conversion request data is stored in the shared area 142 of the RAM 140 provided in the fax 100 (S210: NO). This conversion request data is stored by the fax 100 in the process of S130 described in FIG. 3.

If conversion request data is stored in the process of S210 (S210: YES), then the CPU 212 reads this conversion request data together with image data from the shared area 142 (S220). Here, the conversion request data and the scanned image data was stored by the fax 100 in the process of S120 in FIG. 3.

Next, the CPU 212 generates converted image data by converting the format of the image data read in the process of S220 into the data format (JPEG format) specified by the conversion request data read in the same process (8230).

Next, the CPU 212 stores the converted image data generated in S230 in the shared area 142 (S240). After the converted image data is stored, the fax 100 transmits this converted image data through facsimile communications in the process of S180 of FIG. 3.

The CPU 212 then deletes the conversion request data read in S220 from the shared area 142 (S250), and returns to the process of S210.

Figure 5:
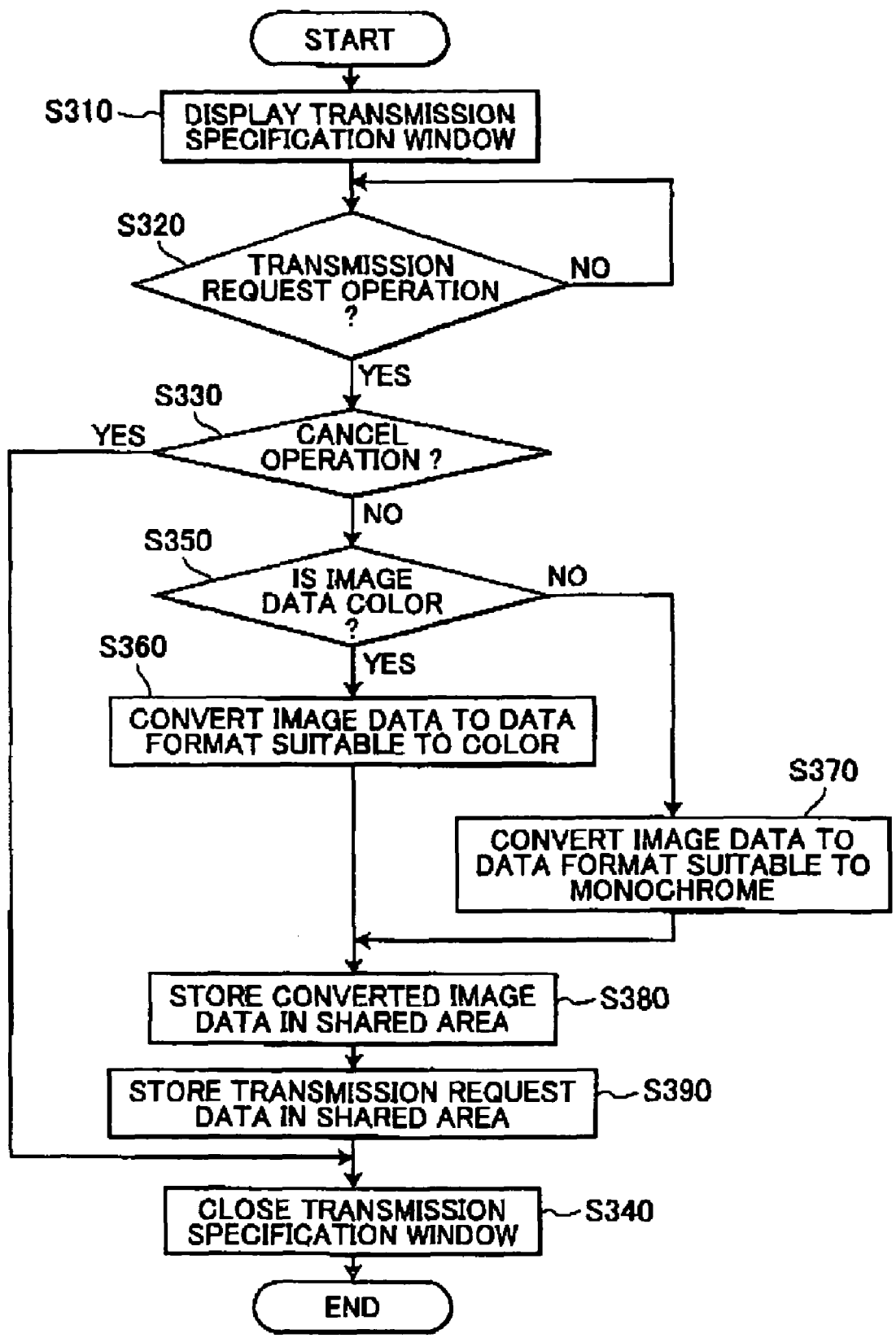
FIG. 5 is a flowchart showing steps in a transmission request process executed by the PC.

(2) Transmission Request Process Executed by the PC 200 when Transmission of an Image Data through Facsimile Communications is Initiated by an Operation on the PC 200 End Next, steps in a transmission request process executed by the CPU 212 provided in the PC 200 will be described with reference to FIG. 5. This transmission request process begins after the coordinated processing program is started and when a transmission request operation set as the operation for issuing a request to the fax 100 to transmit an image through facsimile communications is executed.

Figure 6:
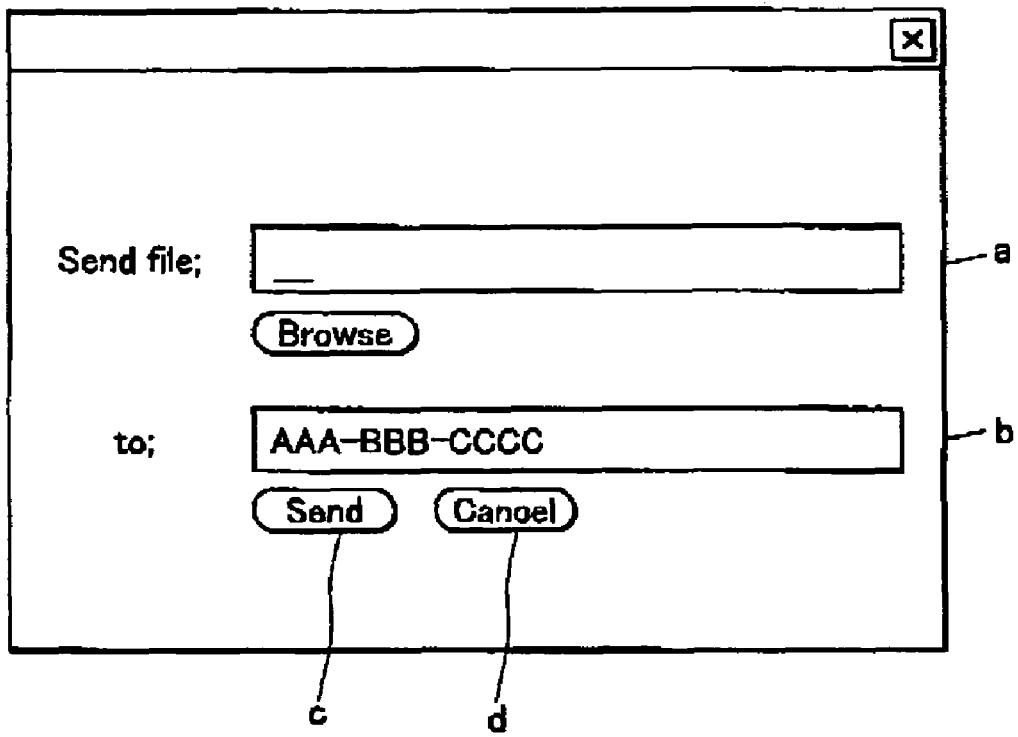
FIG. 6 shows a transmission specification window displayed on the display of the PC.

First, a transmission specification window is displayed in the display 250 (S310). In this process, as shown in FIG. 6, the transmission specification window displayed on the display 250 includes an image specifying space a for specifying image data to be transferred, a destination specifying space b for specifying a transmission destination for transmitting the image, a Send button c for executing transmission of the image data, a Cancel button d for canceling the transmission request process, and the like.

Once the transmission specification window is displayed on the display 250, the user operates the input unit 240 to input a filename for the image data in the image specifying space a and an identification number for the transmission destination in the space b. Subsequently, the user can either perform an operation to specify (click) the Send button c (hereinafter referred to as a transmission request operation) or an operation to specify the Cancel button d (hereinafter referred to as a cancel operation).

Next, the CPU 212 waits until the input unit 240 has been operated (S320: NO).

If a cancel operation has been performed through the input unit 240 in S320 (S320: YES, S330: YES), then the CPU 212 clears the display of the transmission specification window displayed in S310 from the display 250 (S340), and the transmission request process ends.

However, if a transmission request operation has been executed by the input unit 240 in S320 (S320; YES, S330: NO), then the CPU 212 determines whether the image data specified in the image specifying space a is color or monochrome data (S350).

If the image data specified in the image specifying space a is determined to be color image data in S350 (S350: YES), then the CPU 212 generates converted image data by converting the image data specified in the image specifying space a to a data format (JPEG format) suitable for transmitting color image data through facsimile communications (S360).

However, if the image data specified in the image specifying space a is found to be monochrome in S350 (S350: NO), then the CPU 212 generates converted image data by converting the image data specified in the image specifying space a to a data format (TIFF (Tagged Image File Format)) suited for transmitting monochrome image data through facsimile transmission (S370).

After completing the processes in S360 or S370, the CPU 212 stores the converted image data generated in these processes in the shared area 142 (S380). Next, the CPU 212 stores transmission request data in the shared area 142 for issuing a request to the fax 100 to transmit the converted image data recorded in the process of S380 through facsimile communications (S390), and the CPU 212 advances to 8340. In the process of S390 the CPU 212 generates transmission request data specifying an identification number of the transmission destination indicated in the space b and stores this data in an appended state to the converted image data stored during the process of S380. Once the transmission request data has been stored in the shared area 142 in a second facsimile transmission process described later (FIG. 7), the fax 100 transmits the image data stored in the shared area 142 to the transmission destination indicated by the identification number specified in the transmission request data.

<Second Facsimile Transmission Process Executed by the Fax 100>

Next, steps in a second facsimile communication process executed by the CPU 132 in the fax 100 will be described with reference to FIG. 7. The second facsimile communication process begins when transmission request data is stored in the shared area 142 of the RAM 140. The transmission request data is stored by the PC 200 in the process of S390 in FIG. 5.

First, the CPU 132 transmits the converted image data stored in the shared area 142 based on the transmission request data also stored in the shared area 142 (S410). In this process, as in the process of S180 described in FIG. 3, a transmission path is established and the converted image data stored in the shared area 142 is transmitted to the destination indicated by the identification number specified in the transmission request data. After completing the transmission, the setting for the transmission path is canceled.

Next, the CPU 132 deletes the converted image data transmitted in the process of S410 from the shared area 142 (8420).

Finally, the CPU 132 deletes the transmission request data from the shared area 142 (S430) and the facsimile communication process ends.

(3) Facsimile Reception Process Executed by the Fax 100 when Image Data is Received through Facsimile Communications Next, steps in a facsimile reception process executed by the CPU 132 in the fax 100 will be described with reference to FIG. 8. The facsimile reception process begins when input of image signals is first received from the telephone network 400 via the circuit controlling unit 174.

First, the signal transmission path is set in the circuit controlling unit 174 as the path connecting the modem 154 and the telephone network 400 (S510), enabling the transmission of image signals along this path.

Next, image data for one page worth is received through facsimile communications (S520). The image data received during this process is in a format suitable for transmission in facsimile communications (JPEG for color images and TIFF for monochrome images).

Next, the CPU 132 stores the image data for one page worth received in the process of S520 in the shared area 142 of the RAM 140 (S530). Next, the CPU 132 stores reverse conversion request data in the shared area 142 to request the reverse conversion of the single page of image data stored in the shared area 142 in S530 (S540). In this process, the CPU 132 generates data identifying a target data format for conversion as the data requesting that the page of image data stored in the shared area 142 in S520 be converted (converted back) from the data format suitable for transmission and facsimile communications (JPEG or TIFF) to a data format suitable for printing by the printing unit 156 (bitmap data in the preferred embodiment). The CPU 132 stores this request data in the shared area 142 appended to the image data stored in S530.

After the conversion request data is stored in the shared area 142, the PC 200 generates converted image data by converting the format of the image data stored in the shared area 142 in a reverse format conversion process described later (FIG. 9). Subsequently, the PC 200 issues a command (transmits command data) to the fax 100 via a device driver to print the converted image data. Upon receiving this command, the fax 100 executes a process for controlling the printing unit 156 to print the converted image data during the facsimile reception process.

Next, the CPU 132 determines whether another page exists (S550). In this process, the CPU 132 determines that another page exists if reception was begun for image signals representing a following page after receiving image data for a single page in the process of S510.

If the CPU 132 determines that another page exists in the process of S550 (S550: YES), then the CPU 132 returns to S520.

However, if the CPU 132 determines that another page does not exist (S550: NO), then the CPU 132 cancels the setting in the circuit controlling unit 174 establishing the transmission path connecting the modem 154 and the telephone network 400 (S560), and the facsimile reception process ends. Accordingly, image signals can no longer be transferred along the path connecting the modem 154 and the telephone network 400.

<Reverse Format Conversion Process Executed by the PC 200>

Next, steps in the reverse format conversion process executed by the CPU 212 in the PC 200 will be described with reference to FIG. 9. This process is repeatedly executed while the coordinated processing program is running.

First, the CPU 212 waits until reverse conversion request data is stored in the shared area 142 of the RAM 140 in the fax 100 (S610: NO). This reverse conversion request data is data stored by the fax 100 during the process of S540 in FIG. 8.

When reverse conversion request data is stored in S610 (S610: YES), the CPU 212 reads this reverse conversion request data together with image data from the shared area 142 (S620). The image data read together with the reverse conversion request data is data stored by the fax 100 during the process of S530 in FIG. 8.

Next, the CPU 212 generates converted image data by converting the format of the image data read in S620 to a data format (bitmap data) specified by the reverse conversion request data that was read in the same process (S630).

Next, the CPU 212 issues a command to the fax 100 via a device driver to print an image represented by the converted image data generated in S630 (S640). In this process, command data is generated and transmitted to the fax 100 end commanding that the image be printed.

Subsequently, the CPU 212 deletes the reverse conversion request data read in S620 from the shared area 142 (S650), and returns to S610.

Figure 3:
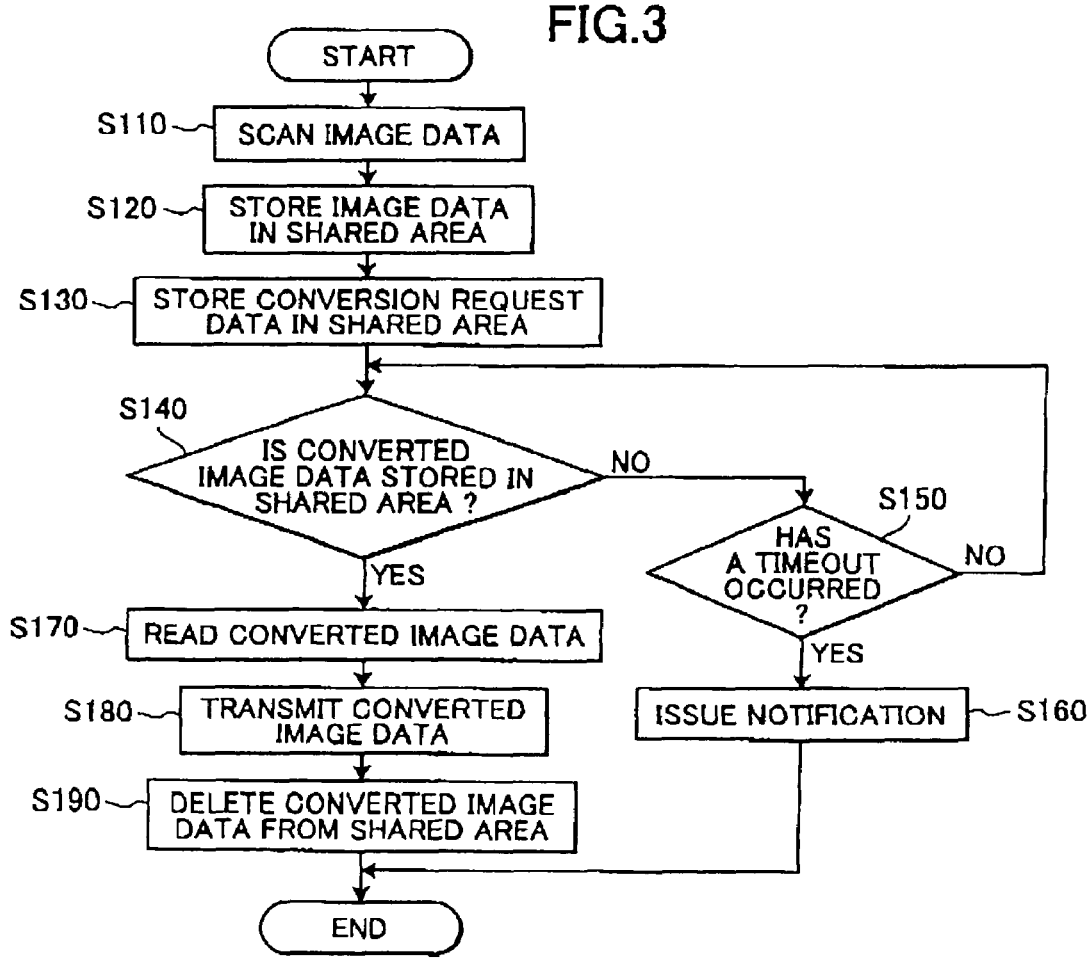
FIG. 3 is a flowchart showing steps in a first facsimile transmission process executed by the fax.
Figure 4:
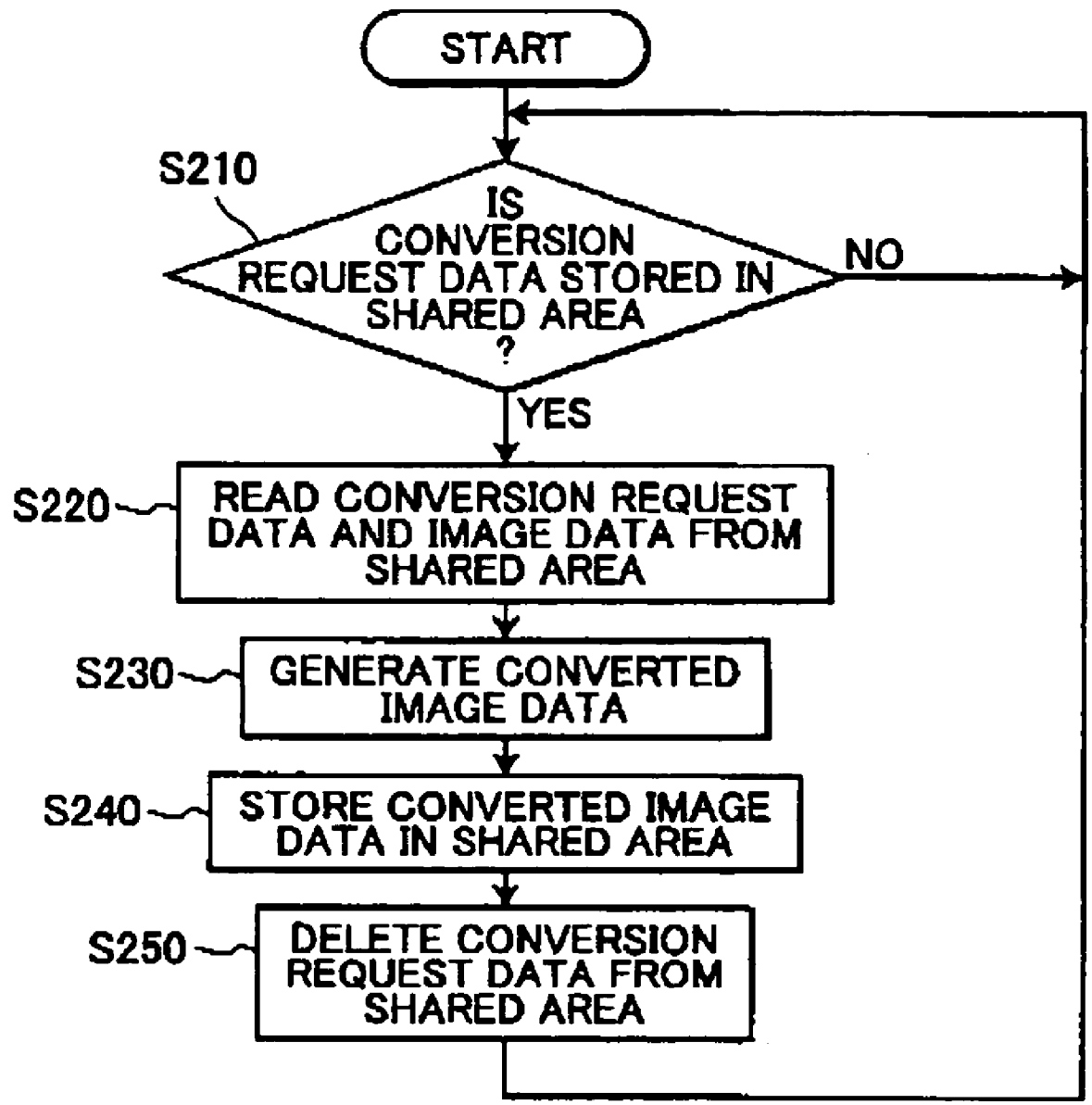
FIG. 4 is a flowchart showing steps in a format conversion process executed by the PC.

With a data processing system 1 having the above construction, when the fax 100 stores request data (conversion request data or reverse conversion request data) in the shared area 142 of the RAM 140 (S130 of FIG. 3 and S540 of FIG. 8), the PC 200 generates data (converted image data and a print command) based on the request data stored on the fax 100 end and transmits this data to the fax 100 (S240 of FIG. 4 and S640 of FIG. 9). The fax 100 executes a process for implementing the specified function (transmission of image data or printing of an image) based on data transmitted from the PC 200. Hence, the fax 100 can direct the PC 200 to execute part of the process simply by storing request data in the shared area 142, enabling the execution of specific functions in cooperation with the PC 200.

More specifically, the fax 100 can direct the PC 200 to convert the format of image data simply by storing conversion request data and the image data in the shared area 142, thereby implementing facsimile communications in cooperation with the PC 200. Further, the fax 100 can direct the PC 200 to convert image data to a suitable data format for printing simply by storing reverse conversion request data and the image data in the shared area 142, thereby implementing the printing of an image in cooperation with the PC 200.

Further, since processes involving image data conversion need not be performed on the fax 100 end, it is not necessary that the CPU 132 have a high processing capacity, thereby keeping down production costs of the fax 100. While the CPU on the PC 200 end must have sufficient processing capacity to convert the image data in this case, most PCs in use today have sufficient processing capacity to convert image data as executed by the PC 200 in the preferred embodiment. Accordingly, it is only necessary to provide a facsimile communication program on the PC 200 end.

Further, after the PC 200 generates data based on the request data (converted image data and a print command; S230 of FIG. 4 and S630 of FIG. 9), the PC 200 deletes the request data requesting that this data be generated from the fax 100 end (the shared area 142: S250 and S50). Here, the PC 200 generates data based on this request data when request data is stored on the fax 100 end (the shared area 142 of the RAM 140). Accordingly, if the request data remains stored on the fax 100 end, the same data might be generated a plurality of times based on the same request data, causing the same function to be repeatedly executed. However, by deleting this request data from the fax 100 end (the shared area 142) after generating data based on the request data, as described above, it is possible to prevent the same data being generated a plurality of times based on the same request data, thereby preventing the same function from being repeatedly executed undesirably.

Further, by deleting the request data itself from the RAM 140, it is possible to eliminate the possibility of unnecessary data occupying the RAM 140, thereby effectively using the same.

Second Embodiment

A data processing system 2 has the same construction as the data processing system 1 of the first embodiment. Since the construction of the data processing system 2 according to the second embodiment and the processes executed by the same differ only slightly from the first embodiment, only the different points will be described in detail below.

In addition to the components in the fax 100 of the first embodiment, the fax 100 of the second embodiment includes a network interfacing unit (hereinafter referred to as a network I/F) 176 for connecting the fax 100 to an internet 600 (refer to the dotted lines in FIG. 1).

Further, in addition to the input buttons, speakerphone button, and start button, the control panel 120 includes an answering machine button and the like for starting and stopping an answering machine function well known in the art.

Figure 11:
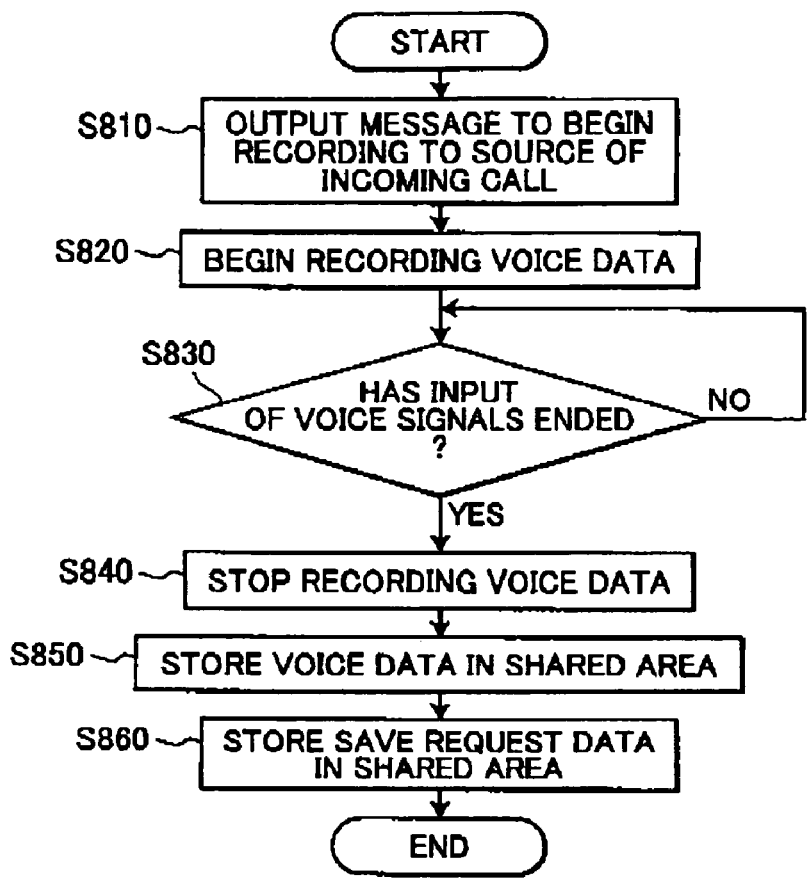
FIG. 11 is a flowchart showing steps in a message recording process executed by the fax according to the second embodiment.

Further, in addition to the shared area 142, the RAM 140 has an accumulating area 144 (indicated by the dotted lines in FIG. 2) for recording image data generated by a scanning process described later (FIG. 10) and voice data generated by a message recording process described later (FIG. 11).

Further, image data generated by the scanning unit 152 is normally outputted to the telephone network 400 via the circuit controlling unit 174 and stored in the accumulating area 144 of the RAM 140 during the scanning process described later (see FIG. 10).

<Scanning Process Executed by the Fax 100>

Next, steps in a scanning process executed by the CPU 132 in the fax 100 will be described with reference to FIG. 10. The scanning process begins when the start button on the control panel 120 is pressed while paper carrying a printed image is set at the scanning position.

First, the CPU 132 controls the scanning unit 152 to scan the image printed on the paper as image data (S710). Next, the image data read in S710 is stored in the shared area 142 of the RAM 140 (S720). In this process, the image data is recorded in the bitmap format.

Figure 12:
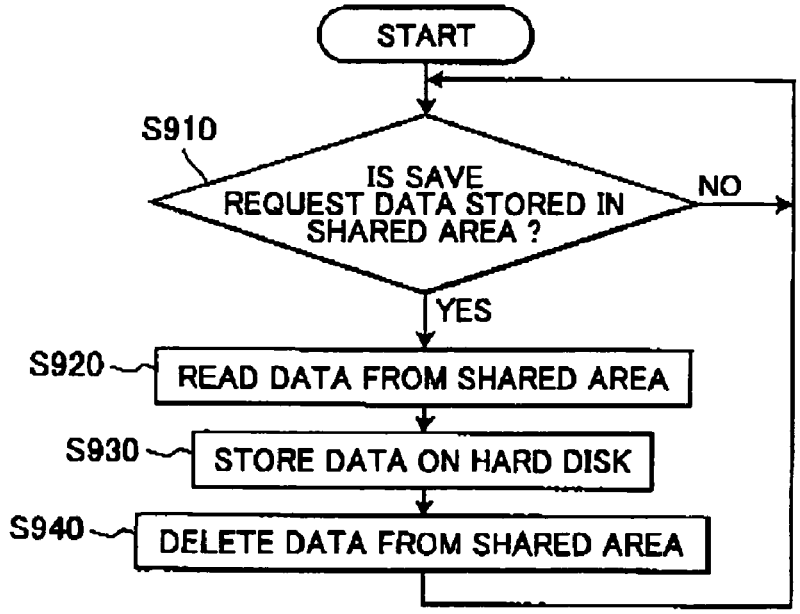
FIG. 12 is a flowchart showing steps in a data saving process executed by a PC according to the second embodiment.

Next, the CPU 132 stores save request data in the shared area 142 to request that the image data stored in the shared area 142 in S720 be saved (S730). In this process, the CPU 132 generates data requesting that image data be recorded on the PC 200 end and records this request data in the shared area 142 appended to the image data stored in S720. After the save request data is recorded in the shared area 142, the PC 200 records the image data stored in the shared area 142 in the HD 220 in a data saving process described later (FIG. 12).

Next, the CPU 132 stores the image data read in S710 in the accumulating area 144 (S740). In this process, the image data is stored in the bitmap format.

<Message Recording Process Executed by the Fax 100>

Next, steps in a message recording process executed by the CPU 132 of the fax 100 will be described with reference to FIG. 11. The message recording process begins when an incoming call is received via the telephone network 400 while the answering machine function is operating.

First, a record start message prompting the user at the source of the incoming call to record a message is outputted to the source of the incoming call (S810). In this process, voice signals for the record start message prerecorded in the RAM 140 are modulated by the modem 154, and the resulting voice signals are outputted to the source of the incoming call via the circuit controlling unit 174.

Next, the CPU 132 begins recording voice signals inputted from the source of the incoming call as voice data (S820). This process begins demodulating the voice signals inputted via the circuit controlling unit 174 with the modem 154 and begins recording the resulting voice data in the accumulating area 144. Here, the voice data is recorded in the WAV format.

Next, the CPU 132 waits until voice signals inputted from the source of the incoming call end (S830: NO). When the input of voice signals from the source of the incoming call ends in S830 (S830: YES), then the CPU 132 stops the recording of voice data, which was begun in S820 (S840).

Next, the voice data recorded in steps S820-S840 is stored in the shared area 142 (S850). Next, the CPU 132 records save request data in the shared area 142 in order to request that the voice data stored in the shared area 142 in 350 be saved (S860). In this process, the CPU 132 generates data requesting that the voice data be stored on the PC 200 end and records this data in the shared area 142 appended to the voice data recorded in S850. After the save request data is stored in the shared area 142, the PC 200 stores the voice data recorded in the shared area 142 on the HD 220 in a data saving process described later (FIG. 12).

<Data Saving Process Executed by the PC 200>

Next, the steps in the data saving process executed by the CPU 212 of the PC 200 will be described with reference to FIG. 12. This process is repeatedly executed while the coordinated processing program is running.

First, the CPU 212 waits until save request data is stored in the shared area 142 of the RAM 140 provided in the fax 100 (S910: NO). The save request data is data stored by the fax 100 in S730 of FIG. 10 or S860 of FIG. 11.

When save request data is recorded in S910 (S910; YES), then the CPU 212 reads this save request data along with image data or voice data from the shared area 142 (S920). Here, the data read along with the save request data is either data recorded by the fax 100 in S720 of FIG. 10 or data recorded by the fax 100 in S850 of FIG. 11.

Next, data read in S920 is stored on the HD 220 (S930). In this process, the CPU 212 stores the image data read in S920 in a storage area of the HD 220 predetermined to be the storage area for storing data read based on save request data.

Finally, all data read in S920 is deleted from the shared area 142 (S940), and the CPU 212 returns to 5910. In the process of S940, the CPU 212 deletes both the save request data and the image data or voice data from the shared area 142.

<Data Communication Process Executed by the Fax 100>

Next, steps in the data communication process executed by the CPU 132 in the fax 100 will be described with reference to FIG. 13. The data communication process transmits data stored in the accumulating area 144 in the aforementioned scanning process (FIG. 10) and the message recording process (FIG. 11) via the internet 600. This process begins when an operation is performed to specify data to be transferred or data for identifying a transfer destination (e-mail address in the preferred embodiment).

First, the CPU 132 stores the data specified by the control panel 120 (image data or voice data) in the shared area 142 (S1010).

Next, the CPU 132 stores conversion request data in the shared area 142 in order to request conversion of the data stored in the shared area 142 in S1010 (S1020). In this process, the CPU 132 generates data capable of specifying a format for conversion as the data for requesting that data specified by the control panel 120 be converted to a compressed data format and stores the compressed data in the shared area 142 appended to the data stored in S1010. Here, the compressed data format is the JPEG format when the data specified by the control panel 120 is image data and the MP3 (MPEG audio stream layer-3) format when the specified data is voice data. In the process of S1020, the CPU 132 starts a counter for counting elapsed time after the conversion request data is stored in the shared area 142.

After the conversion request data is stored in the shared area 142, the PC 200 generates converted data (converted image data or converted voice data) by converting the format of the data stored in the shared area 142 in a format conversion process and stores the converted data in the shared area 142.

Next, the CPU 132 determines whether converted data has been stored in the shared area 142 (S1030). If the converted data has not been stored in S1030 (S1030: NO), then the CPU 132 determines whether a timeout has occurred since recording the conversion request data (S1040). This process is the same as the process of S150 in FIG. 3.

If a timeout has not occurred in S1040 (S1040: NO), then the CPU 132 returns to S1030. However, if a timeout has occurred in S1040 (S1040: YES), then the CPU 132 issues a notification that the converted data has not been stored in the shared area 142 (S1050), and ends the data communication process. As in S160 of FIG. 3, the notification is issued in the process of S1050 by displaying a message on the display panel 114 indicating that the converted data has not been stored due to some problem. Further, the timer started in the process of S1020 is stopped and reset in S1050.

However, if converted data has been stored in the process of S1030 (S1030; YES), then the CPU 132 reads the converted data from the shared area 142 (S1060). In this process, the converted data is read, and the timer started in the process of S1020 is stopped and reset.

Next, the converted data read in S1060 is transmitted to a transmission destination according to identification data specified by the control panel 120 (S1070).

Finally, the CPU 132 deletes the converted data read in S1060 from the shared area 142 (S1080), and the data communication process ends.

<Format Conversion Process Executed by the PC 200>

Next, steps in a format conversion process executed by the CPU 212 of the PC 200 will be described. Being identical to the process in FIG. 4, this format conversion process will be described with reference to FIG. 4.

First, the CPU 212 waits until conversion request data is stored in the shared area 142 of the RAM 140 provided in the fax 100 (S210: NO). This conversion request data is stored together with image data or voice data in the processes of S1010 and S1020 described in FIG. 13.

If conversion request data is stored in the process of S210 (S210: YES), then the CPU 212 reads this conversion request data together with image data from the shared area 142 (S220). Here, the conversion request data and the scanned image data is data (image data or voice data) stored by the fax 100 in the process of S1010 in FIG. 13.

Next, the CPU 212 generates converted data by converting the format of the data read in the process of S220 into the data format specified by the conversion request data read in the same process (S230). In this process, image data is converted to the JPEG format to generate converted image data, while voice data is converted to the MP3 format to generate converted voice data.

Next, the CPU 212 stores the converted data generated in S230 in the shared area 142 (S240). After the converted data is stored, the fax 100 transmits this converted data via the internet 600 in the process of S1070 of FIG. 13.

The CPU 212 then deletes the conversion request data read in S220 from the shared area 142 (S250), and returns to the process of S210.

Figure 13:
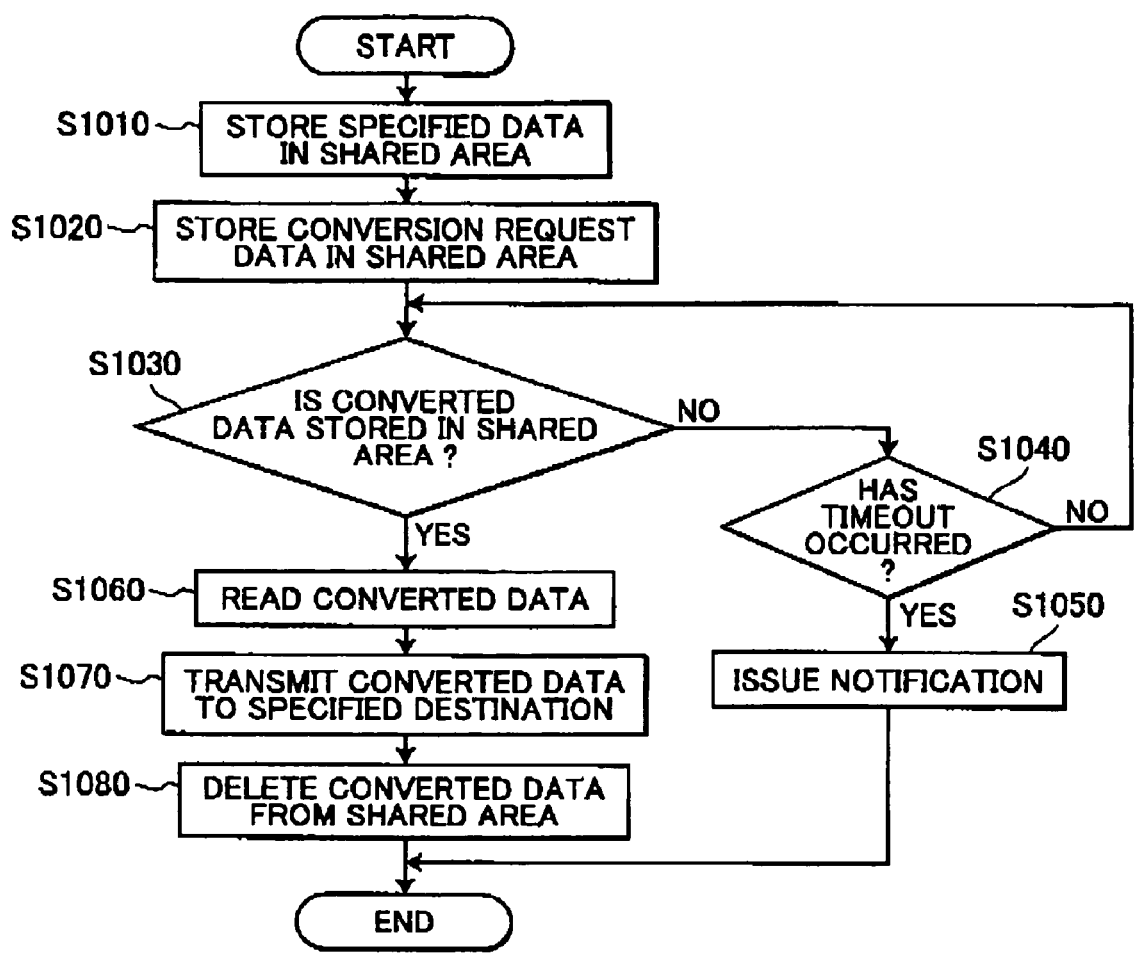
FIG. 13 is a flowchart showing steps in a data communication process executed by the fax according to the second embodiment.

The data processing system 2 having the above construction can achieve the following effects obtained by having a construction different from the first embodiment with the data processing system 2 of this construction, the fax 100 stores data specified by the control panel 120 from among data recorded in the accumulating area 144 of the RAM 140 together with conversion request data in the shared area 142 (S1010 and S1030 of FIG. 13). This results in a request for converting the format of data specified by the control panel 120. In this way, a user can request conversion of the data format for arbitrary data specified by the control panel 120.

Further, voice signals inputted via the telephone network 400 can be stored in the accumulating area 144 as voice data (S820-S840 of FIG. 11). Hence, voice data can be transmitted after an operation is performed on the control panel 120.

Further, after conversion request data is stored in the shared area 142 (S1020 of FIG. 13), the PC 200 generates data by compressing the amount of data stored with the conversion request data and stores the compressed data in the shared area 142. Hence, since the data can be transmitted in a smaller amount, the efficiency of data transmission is improved over transmission of image data and voice data in the original data format, without unnecessarily increasing traffic on the internet 600.

Further, since the image data and voice data stored on the fax 100 end is recorded on the PC 200 end (S930 of FIG. 12), this data can be saved and managed on the PC 200 end. Accordingly, images represented by image data or voice represented by voice data stored on the PC 200 end can easily be used and edited by an application program on the PC 200 end.

While the invention has been described in detail with reference to specific embodiments thereof, it would be apparent to those skilled in the art that many modifications and variations may be made therein without departing from the spirit of the invention, the scope of which is defined by the attached claims.

For example, in the embodiments described above, the construction of the data processing system in the present invention is applied to a system including the fax 100 and the PC 200. However, the present invention may be configured of devices other than the fax 100 and the PC 200, such as a data processing system configured of one device or three or more devices.

Further, the above-described embodiments give examples in which the processes shown in the flowcharts are executed by a computer system having the CPU 132 of the fax 100 and the CPU 212 of the PC 200. However, a separate computer system connected to the fax 100 and PC 200 via a wired or wireless signal transmission line may be used to execute part or all of these processes.

Further, the fax 100 in the aforementioned embodiments is configured to execute the processes indicated by the flowcharts according to programs recorded in the ROM 134. However, these programs may also be recorded on the memory card 500, while the processes indicated in the flowcharts may be executed according to the programs stored on the memory card 500 when the memory card 500 is mounted in the media drive 180.

Further, the PC 200 of the aforementioned embodiments is configured to execute the processes indicated in the flowcharts according to programs recorded on the HD 220. However, if the PC 200 is capable of performing data input and output between a storage medium such as a floppy disk, memory card, or the like, the processes indicated in the flowcharts may be executed based on the above programs stored on this storage medium.

Further, the telephone network 400 in the above-described embodiments may be a public switched telephone network (PSTN) or an IP telephone network.

Further, the fax 100 of the embodiments described above is configured to transmit and receive (facsimile communications) image signals between the telephone network 400. However, the fax 100 may be configured to perform facsimile communications via the Internet 600.

Further, in the above-described embodiments, various data is exchanged between the fax 100 and the PC 200 using the shared area 142 of the RAM 140 in the fax 100. However, this data exchange may also be performed through the memory card 500 mounted in the media drive 180. In this case, the description of "the shared area 142 of the RAM 140" in the embodiments described above should be read as "the memory card 500 mounted in the media drive 180."

Further, in the above described embodiments, the PC 200 is configured to prevent the same data being generated a plurality of times based on the same request data by deleting the request data from the fax 100 end in the processes of S250 of FIG. 4, S650 of FIG. 9, and S940 of FIG. 12.

However, other configurations may be used to prevent the same data from being generated a plurality of times based on the same request data. For example, the above processes may be configured to modify the request data used to generate data so it is possible to determine that the data has already been generated (request data modification commanding means). Further, the fax 100 can determine not only whether request data has been recorded but whether data has been generated based on the request data. With this construction, "determining whether data has already been generated" may be achieved by overwriting part of the request data with content indicating data has already been generated or appending data to the request data indicating that data has already been generated.

Figure 7:
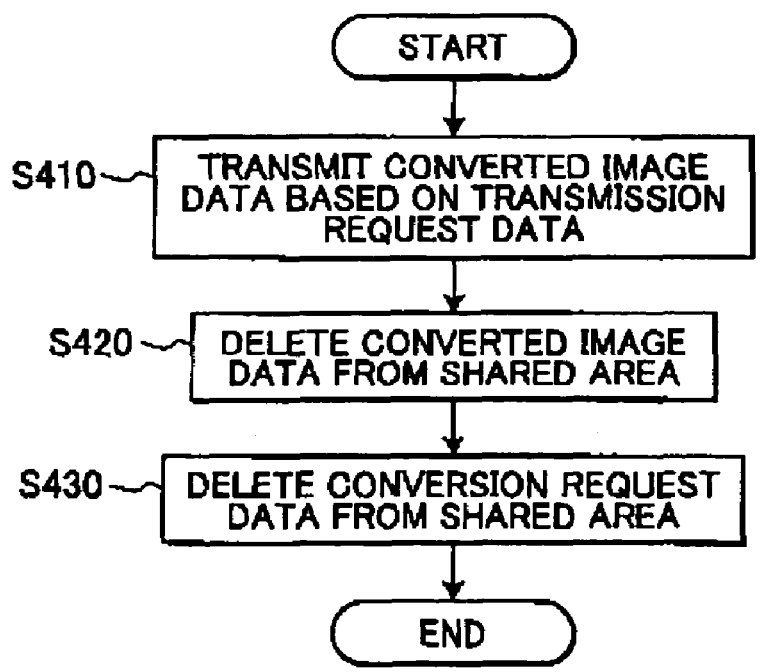
FIG. 7 is a flowchart showing steps in a second facsimile transmission process executed by the fax.

Further, in the above described embodiments, the fax 100 is configured to prevent the same process from being repeatedly executed based on the same data by deleting data that triggers the transmission or printing of other data from the RAM 140 in the processes of S190 of FIG. 3, S420 and S430 of FIG. 7, S1080 of FIG. 13, and S1140 of FIG. 15. However, other constructions may be used to prevent these same processes from being repeatedly executed based on the same data. For example, the aforementioned processes may be configured to modify the data that triggers the transmission or printing of other data so it is possible to determine when data has already been generated and to determine in the process prior to generating data not only whether request data has been recorded but whether the data has already been generated. With this construction, "determining whether data has already been generated" can be achieved by overwriting a part of the request data with content indicating data has already been generated or appending data indicating that the data has already been generated to the request data.

Further, in the second embodiment described above, the recording of voice data is started and stopped based on the condition of input of voice signals from the source of the incoming call. However, when employing a method well known in the art for recording voice signals as voice data during a voice call, the recording of voice data may be started and stopped based on prescribed operations performed on the control panel 120 during a voice call.

In the embodiments described above, the PC 200 directs the fax 100 via a printer driver to print images from converted image data that was generated based on reverse conversion request data (S640 of FIG. 9). However, the printing of images indicated by converted image data may be performed without using a printer driver. For example, the PC 200 may be configured to perform the reverse format conversion process described below, while the fax 100 may be configured to perform the printing process described below.

<For Reverse Format Conversion Process Executed by the PC 200>

This reverse format conversion process will be described with reference to FIG. 14, wherein the processes of S642 and S644 are performed in place of S640 of FIG. 9 and the processes of S651 through S657 are added after S650 of FIG. 9.

After converted image data has been generated in S630, the converted image data is stored in a specific storage area of the HD 220 under a sequentially numbered (in order of storage) filename (S642).

Next, the CPU 212 deletes the image data read in S620 from the shared area 142 (S644). After deleting the reverse conversion request data in S650, the CPU 212 determines whether reverse conversion request data has been recorded in the shared area, as in the process of S610 (S651).

If reverse conversion request data has been stored in S651 (S651: YES), then the CPU 212 returns to S620. However, if conversion request data has not been stored in S651 (S651: NO), then a variable N is set to 1 (N←1; S652). Hereinafter, "n" will indicate the value to which the variable N is set.

Next, the CPU 212 stores the nth converted image data in the shared area 142 (S653).

Next, the CPU 212 stores print command data in the shared area 142 for instructing that the converted image data stored in S653 be printed (S654). After the print command data has been stored in the shared area 142, the fax 100 prints the image indicated by the converted image data in a printing process described later (FIG. 15) and deletes the converted image data.

Next, the CPU 212 waits until the converted image data stored in S653 has been deleted from the shared area 142 (S655: NO).

When the converted image data has been deleted from the shared area 142 in S655 (S655: YES), then the variable N is incremented 1 (N←n+1; S656).

Here, if the $n^{th}$ converted image data exists (S657: YES), then the CPU 212 returns to S653. However if the $n^{th}$ converted image data does not exist (S657: NO), then the CPU 212 returns to S610.

<Printing Process Executed by the Fax 100>

Next, steps in a printing process executed by the CPU 132 of the fax 100 will be described with reference to FIG. 15. This printing process begins when print command data is stored in the shared area 142 of the RAM 140. This print command data is data stored by the PC 200 in S654 of FIG. 14.

First, the CPU 132 reads the converted image data from the shared area 142 (S1110). Next, the printing unit 156 prints an image represented by the converted image data read in S1110 (S1120).

Next, the CPU 132 deletes the converted image data from the shared area 142 (S1130). Finally, the CPU 132 deletes the print command data from the shared area 142 (S1140).

Figure 14:
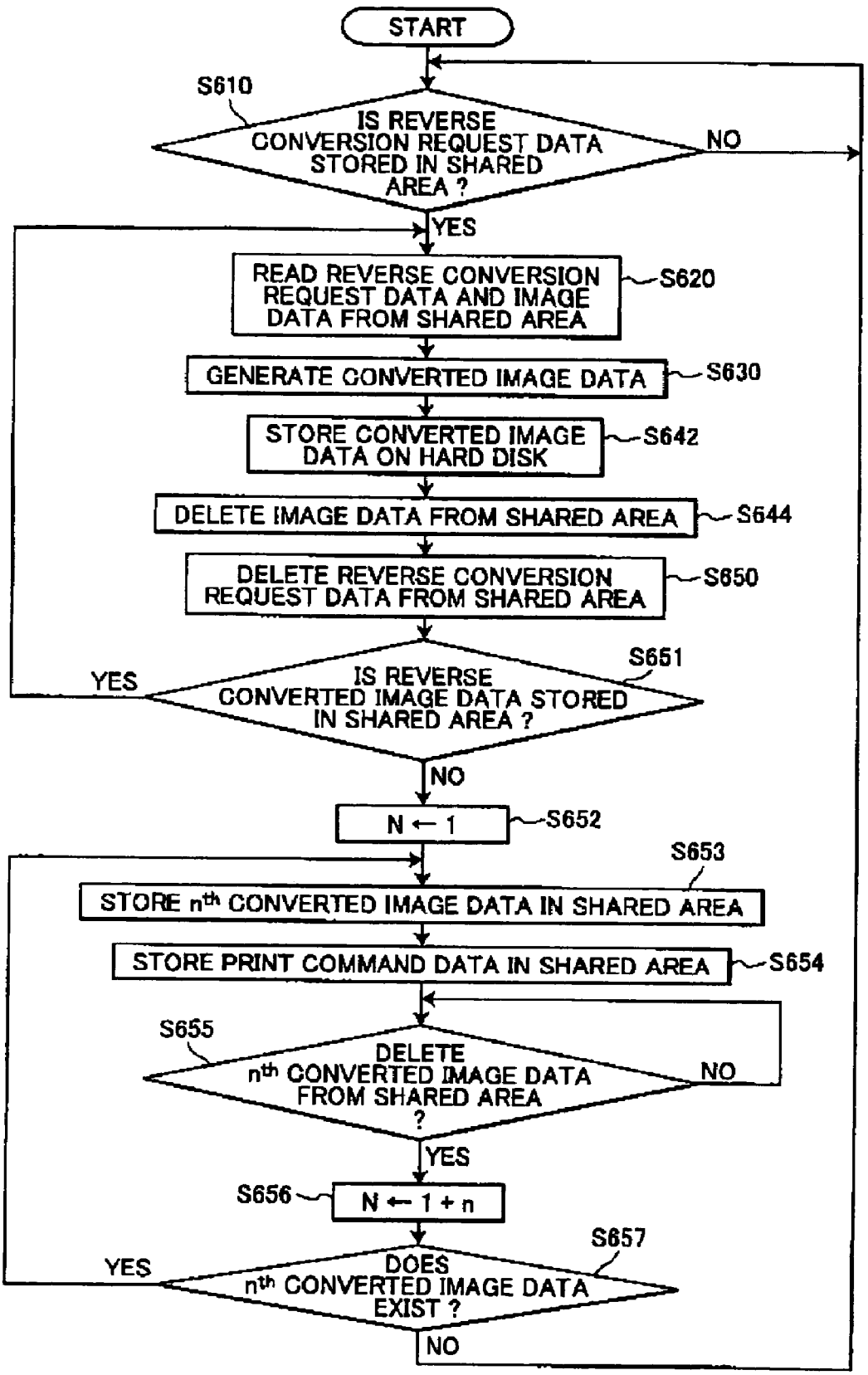
FIG. 14 is a flowchart showing steps in a reverse format conversion process executed by a PC according to a variation of the embodiments.

With this construction, the fax 100 can be directed to print images based on converted image data simply by recording converted image data and print command data from the PC 200 end in the shared area 142 of the RAM 140 in the fax 100 (S653 and S654 of FIG. 14). In this case, there is no need to incorporate a printer driver on the PC 200 end.

What is claimed is:

1. A data processing system comprising a main terminal device having one or more functions, and a sub terminal device connected to the main terminal device and performs data communications therewith, wherein the main terminal device comprises:

a data storing unit that stores various types of data, and enables the sub terminal device to recognize the data storing unit as an external storage device so as to enable the sub terminal device to unrestrictedly save any type of data file to the data storing unit and retrieve any data file from the data storing unit;

a request storage commanding unit that receives commands from an external source and stores request data and original data in association with the request data in the data storing unit, the request data being generated from the main terminal device for requesting the sub terminal device to generate implementation data required for implementing one or more functions from the original data; and a function implementing unit that executes a process to implement a function based on the implementation data when the implementation data is transmitted from the sub terminal device following a command by the request storage commanding unit, and wherein the sub terminal device comprises:
a data reading unit that monitors the data stored in the data storing unit and that automatically reads the original data and the request data stored in the data storing unit whenever the original data and the request data are stored in the data storing unit;
a data generating unit that generates the implementation data from the original data based on the request data read by the reading unit; and
an implementation data transmitting unit that transmits the implementation data generated by the data generating unit to the main terminal device.

2. The data processing system according to claim 1, wherein the implementation data transmitting unit transmits the implementation data generated by the data generating unit to the main terminal device and directs the implementation data to be stored in the data storing unit, and the function implementing unit executes a process to implement the function based on the implementation data when the implementation data transmitted from the sub terminal device is stored in the data storing unit.

3. The data processing system according to claim 2, wherein the main terminal device further comprises an implementation data deleting unit that deletes the implementation data stored in the data storing unit after the function implementing unit executes the process to implement the function.

4. The data processing system according to claim 1, wherein the sub terminal device further comprises a request deleting unit that deletes the request data stored in the data storing unit after the data generating unit generates the implementation data.

5. The data processing system according to claim 1, wherein the main terminal device further comprises:
an image communicating unit that transmits and receives image data via a network; and
a printing unit that prints various images on a recording medium,
wherein the request storage commanding unit stores the request data with the image data attached to the request data in the data storing unit when the image data is received by the image communicating unit, the implementation data being print data converted from the image data and having a data format that is printable by the printing unit, the request data being data for requesting generation of the implementation data; and
the function implementing unit executes a printing process for images indicated by the print data by controlling the printing unit to print the images based on the implementation data when the implementation data is received from the sub terminal device after the command by the request recording command unit; and
wherein the data generating unit generates converted image data by converting the image data attached to the request data to a data format requested by the request data when the request data is stored in the data storing unit.

6. The data processing system according to claim 1, wherein the main terminal device is connected to a network and performs data communications therewith, the main terminal device further comprising:
a data acquiring unit that receives commands from an external source outside the main terminal device and acquires external data inputted from the external source; and
an external storage commanding unit that stores the external data acquired by the data acquiring unit in the data storing unit;
wherein the request storage commanding unit stores the request data with the external data attached to the request data in the data storing unit after the external data is stored in the data storing unit, the implementation data being data converted from the external data and having a data format that is transferable to the network, the request data being data for requesting generation of the implementation data; and
the function implementing unit implements data communications in the data format by transmitting the implementation data via the network when the implementation data is transmitted from the sub terminal device after issuance of the command by the request storage commanding unit; and
the data generating unit generates converted external data converted from the external data attached to the implementation data to the data format requested by the request data when the request data is stored in the data storing unit.

7. The data processing system according to claim 6, wherein the main terminal device further comprises transmission specifying unit that prompts a user to specify external data to be transmitted via the network from among external data acquired by the data acquiring unit,
wherein the request storage commanding unit stores the request data in the data storing unit when the external data has been specified by the transmission specifying unit.

8. The data processing system according to claim 6, wherein the main terminal device has a function for implementing a voice call based on voice signals inputted and outputted via the network; and
the data acquiring unit receives commands from an external source and begins and ends the acquisition of voice signals inputted and outputted via the network as the external data.

9. The data processing system according to claim 6, wherein the data acquiring unit receives user operations and scans a prescribed image to acquire image data as the external data; and
the request storage commanding unit stores the request data in the data storing unit when the external data is stored in the data storing unit.

10. The data processing system according to claim 6, wherein the request data is data for requesting that the external data be converted to a compressed data format.

11. The data processing system according to claim 1, wherein the main terminal device is a peripheral device.

12. The data processing system according to claim 1, wherein the main terminal device is one of a telephone, a facsimile device, a printer and a scanner.

13. The data processing unit according to claim 1, wherein the sub terminal device is a personal computer.

14. A terminal device for use in combination with a sub terminal device and having one or more functions, the sub terminal device being connected in use to the terminal device and performing data communications therewith, the terminal device comprising:
a data storing unit that stores various types of data, and enables the sub terminal device to recognize the data storing unit as an external storage device so as to enable the sub terminal device to unrestrictedly save any type of data file to the data storing unit and retrieve any data file from the data storing unit;

a request storage commanding unit that receives commands from an external source and stores request data and original data in association with the request data in the data storing unit, the request data being generated from the main terminal device for requesting the sub terminal device to generate implementation data required for implementing one or more functions from the original data; and a function implementing unit that executes a process to implement a function based on the implementation data when the implementation data is transmitted from the sub terminal device following a command by the request storage commanding unit, and wherein the sub terminal device generates the implementation data from the original data when the request data is stored in the data storing unit and transmits the implementation data to the terminal device.

15. A sub terminal device connected to a main terminal device and performing data communications therewith, wherein the main terminal device has one or more functions, the sub terminal device comprising:

a data reading unit that monitors the data stored in the data storing unit and that automatically reads original data and request data stored in a data storing unit whenever original data and request data are stored in the data storing unit;

a data generating unit that generates implementation data from the original data; and an implementation data transmitting unit that transmits the implementation data generated by the data generating unit to the data storing unit on the main terminal device, wherein the main terminal device stores various types of data, the sub terminal device being accessible to the data stored in the main terminal device to unrestrictedly save any type of data file to the data storing unit and retrieve any data file from the data storing unit, the main terminal device receives commands from an external source and stores the request data and original data in association with the request data, the request data being generated from the main terminal device for requesting the sub terminal device to generate the implementation data, from the original data, required for implementing one or more functions, and the main terminal device executes a process to implement a function based on the implementation data when the implementation data is transmitted from the sub terminal device following a command.

16. A computer readable medium that stores a program for controlling a main terminal device and a sub terminal device connected in use to each other so as to be capable of performing data communications therebetween, the program comprising:

a program for enabling the sub terminal device to recognize a data storing unit on the main terminal device as an external storage device so as to enable the sub terminal device to unrestrictedly save any type of data to the data storing unit and retrieve any data file from the data storing unit;

a program for receiving commands from an external source and storing request data and original data in association with the request data in the data storing unit, the request data being generated from the main terminal device for requesting the sub terminal device to generate implementation data from the original data required for implementing one or more functions on the main terminal;

a program for monitoring the original data stored in the data storing unit and automatically reading, on the sub terminal device, the original data and associated request data from the data storing unit on the main terminal device whenever the original data and request data are stored in the data storing unit;

a program for generating the implementation data from the original data in the sub terminal device in response to the request data associated with the original data; and a program for executing a process to implement a function on the main terminal device based on the implementation data generated from the original data by the sub terminal.

17. A computer readable medium that stores a program for controlling a main terminal device and a sub terminal device connected in use to each other so as to be capable of performing data communications therebetween, the program comprising:

a program for generating request data and original data in association with the request data in the main terminal device for requesting the sub terminal device to generate implementation data from the original data required for implementing a function on the main terminal device;

a program for monitoring the original data stored in the data storing unit and automatically reading, on the sub terminal device, the original data and associated request data generated on the main terminal device whenever the original data and request data are stored in the data storing unit;

a program for generating implementation data from the original data in the sub terminal device;

a program for transmitting the implementation data from the sub terminal device to the main terminal device; and a program for executing a process to implement the function on the main terminal device based on the implementation data after the program of transmitting the implementation data is executed.

* * * * *